US008856738B2

(12) United States Patent  (10) Patent No.: US 8,856,738 B2
Frenkiel et al.  (45) Date of Patent: *Oct. 7, 2014

(54) SYSTEM AND METHOD FOR TRANSPLANTING SOURCE CODE

(75) Inventors: Andrew Lawrence Frenkiel, Irvington, NY (US); Bugra Gedik, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 14 days.

This patent is subject to a terminal disclaimer.

(21) Appl. No.: 13/492,228

(22) Filed: Jun. 8, 2012

(65) Prior Publication Data

US 2014/0229910 A1 Aug. 14, 2014

Related U.S. Application Data

(63) Continuation of application No. 13/468,883, filed on May 10, 2012.

(51) Int. Cl.
G06F 9/44 (2006.01)
G06F 9/45 (2006.01)

(52) U.S. Cl.
USPC .......................... 717/120; 717/110; 717/153

(58) Field of Classification Search
CPC ............... G06F 8/33; G06F 8/38; G06F 8/20; G06F 17/24; G06F 8/71; G06F 8/433
See application file for complete search history.

(56) References Cited

U.S. PATENT DOCUMENTS

| | | | |
|---|---|---|---|
| 6,807,548 B1* | 10/2004 | Kemper | 717/120 |
| 7,003,773 B2 | 2/2006 | Hoennig et al. | |
| 7,240,074 B2 | 7/2007 | Lee | |
| 7,627,861 B2 | 12/2009 | Smith et al. | |
| 7,631,294 B2 | 12/2009 | Rush et al. | |
| 7,735,003 B1 | 6/2010 | Hearn et al. | |
| 8,020,146 B2* | 9/2011 | Hudson, Jr. | 717/120 |
| 8,275,117 B2* | 9/2012 | Huet et al. | 379/265.02 |
| 8,365,286 B2* | 1/2013 | Poston | 726/24 |
| 8,566,787 B2* | 10/2013 | Maskeri Rama et al. | 717/120 |
| 8,601,458 B2* | 12/2013 | Andrade et al. | 717/156 |
| 8,621,417 B2* | 12/2013 | Kaulgud et al. | 717/120 |
| 2007/0011669 A1* | 1/2007 | Varma et al. | 717/168 |
| 2008/0320444 A1* | 12/2008 | Meijer et al. | 717/110 |
| 2009/0037873 A1* | 2/2009 | Ahadian et al. | 717/105 |

(Continued)

OTHER PUBLICATIONS

Weißgerber et al., "Identifying Refactorings form Source-Code Changes", 2006 IEEE, 21st IEEE International Conference on Automated Software Engineering (ASE'06), pp. 1-10; <http://ieeexplore.ieee.org/stamp/stamp.jsp?tp=&arnumber=4019578>.*

(Continued)

Primary Examiner — Thuy Dao
Assistant Examiner — Ben C Wang
(74) Attorney, Agent, or Firm — William J. Stock; McGinn IP Law Group, PLLC

(57) ABSTRACT

A method of integrating an existing source code into a target source code, the method including mapping a plurality of candidate mappings between a change point of the existing source code and a plurality of change points of the target source code, selecting a candidate mapping of the plurality of candidate mappings, automatically updating the existing source code based on the candidate mapping having been selected, and transplanting the existing source code having been updated into the target source code.

18 Claims, 16 Drawing Sheets

(56) References Cited

U.S. PATENT DOCUMENTS

| | | | |
|---|---|---|---|
| 2009/0328002 A1* | 12/2009 | Lin et al. | 717/120 |
| 2010/0077380 A1* | 3/2010 | Baker et al. | 717/120 |
| 2010/0242019 A1* | 9/2010 | Moshkovich et al. | 717/120 |
| 2010/0293535 A1* | 11/2010 | Andrade et al. | 717/156 |
| 2011/0035726 A1* | 2/2011 | Davies et al. | 717/110 |
| 2011/0083118 A1* | 4/2011 | Moore | 717/110 |
| 2011/0252400 A1 | 10/2011 | Scipione | |
| 2011/0283258 A1* | 11/2011 | Yaung | 717/110 |
| 2011/0307501 A1* | 12/2011 | Terwilliger et al. | 707/756 |
| 2012/0089965 A1* | 4/2012 | Batthish et al. | 717/125 |
| 2012/0096434 A1* | 4/2012 | Rama | 717/120 |
| 2012/0144366 A1* | 6/2012 | Lebert | 717/110 |
| 2012/0167040 A1* | 6/2012 | Davies et al. | 717/110 |
| 2012/0192151 A1* | 7/2012 | Parkes et al. | 717/120 |

OTHER PUBLICATIONS

Zibran et al., "Towards Flexible Code Clone Detection, Management, and Refactoring in IDE", 2011 ACM, IWSC'11, May 23, 2011, pp. 75-76; <http://dl.acm.org/results.cfm?h=1&cfid=446850340&cftoken=30083272>.*

Sagonas et al., "Automatic Refactoring of Erlang Programs", 2009 ACM, PPDP'09, Sep. 7-9, 2009, Coimbra, Portugal, pp. 1-11; <http://dl.acm.org/results.cfm?h=1&cfid=446850340&cftoken=30083272>.*

Herbold et al., "Automated Refactoring Suggestions Using the Results of Code Analysis Tools", 2009 IEEE, VALID'09, Sep. 20-25, 2009, pp. 104-109; <http://ieeexplore.ieee.org/stamp/stamp.jsp?tp=&arnumber=5279916>.*

Trifu et al., "Towards Automated Restructuring of Object Oriented Systems", 2007 IEEE, CSMR'07, Mar. 21-23, 2007, pp. 1-10; <http://ieeexplore.ieee.org/stamp/stamp.jsp?tp=&arnumber=5279916>.*

Garrido et al., "Model Refactoring in Web Applications", 2007 IEEE, WSE 2007, Oct. 5-6, 2007, pp. 89-86; <http://ieeexplore.ieee.org/stamp/stamp.jsp?tp=&arnumber=5279916>.*

David Gallardo, "Refactoring for everyone—How and why to use Eclipse's automated refactoring features", Sep. 9, 2003, IBM, pp. 1-20; <http://www.ibm.com/developerworks/library/os-ecref/>.*

Jetbrains, Code Quality Analysis, http://www.jetbrains.com/resharper/, Feb. 17, 2012.

Banker et al., "Automated Softwaremetrics, Repository Evaluation and Software Asset Management: New Tools and Perspectives for Managing Integrated Computer Aided Software Engineering (I-CASE),"Center for Digital Economy Research Stem School of Business Working Paper IS-91-08, May 1991.

Hird, "Towards Reuse of Verified Ada Software," Proceedings of the conference on TRI=ADA '90, ACM, New York, NY, 1990.

Cottrell, et al., "Jigsaw: A Tool for the Small-Scale Reuse of Source code," ICSE Companion '08 Companion of the 30$^{th}$ international conference on Software Engineering, May 10-18, 2008, Leipzig, Germany.

U.S. Office Action for co-pending related U.S. Appl. No. 13/468,883 dated Nov. 20, 2013.

* cited by examiner

Target Source Code 110

```
type TrxType = rstring ticker, rstring date, rstring time,
    rstring ttype, decimal64 price, decimal64 volume,
    decimal64 bidprice, decimal64 bidsize,
    decimal64 askprice, decimal64 asksize;
type SummaryType = rstring ticker, decimal64 minprice,
    decimal64 maxprice, decimal64 avgprice;

composite StockPriceAggregator {
graph
    // Read the transaction data from a file
    stream<TrxType> Transactions = FileSource() {
    param
        file : "TradesAndQuotes.csv.gz";
        format : csv;
        compression : gzip;
    }
    // Aggregate statistics by ticker symbol
    stream<SummaryType> Summaries = Aggregate(Transactions){
    window
        Transactions : partitioned, sliding,
            count(4), count(1);
        param partitionBy : ticker;
    output
        Summaries : ticker = Any(ticker),
            minprice = Min(price),
            maxprice = Max(price), avgprice = Average(price);
    }
    // Write stream of aggregated data to file
    () as sinkPrefixSink = FileSink(Summaries) {
    param file : "SummaryData.csv";
    }
}
```

Existing Source Code 120

```
type
    EmployeeRecordType
    = rstring firstName, rstring lastName, int32 id, rstring division;

composite FilterExample {
Graph
    // Import employee records from another application
    stream<EmployeeRecordType> AllEmployees = Import() {

// Select employees in the research division
    stream<EmployeeRecordType> EmployeesDivision3 = Filter(AllEmployees) {
        param filter : division == "research";
    }
    //retrieve employee status from HR database
    stream<EmployeeRecordType,tuple<srtring status> ActiveEmployeesDivision3
        = ODBCEnrich(EmployeesDivision3) {
        param
            connectionDocument : "./etc/connections.xml" ;
            connection : "HR_Database" ;
            access : "readFromEmployeeTable" ;
            empId : id;
    }
    stream<EmployeeRecordType>
    () as ActiveEmployeesDivision3_e = Export(ActiveEmployeesDivision3) {
        param properties : { kind="employee",
            category="researcher" };
    }
}
```

```
public static SourceDocumentationModel
docModel.get();  // Create doc model
if (compilationUnits == null) {
    return docModel;
}
``` loadDocModel(SourceDocumentationModel
if necessary
Enter new name, press Enter to refactor ▾

FIG. 2

Target Source Code 210

```
type
    TrxType = rstring ticker, rstring date, rstring time,
        rstring ttype, decimal64 price, decimal64 volume,
        decimal64 bidprice, decimal64 bidsize,
        decimal64 askprice, decimal64 asksize;
type
    SummaryType = rstring ticker, decimal64 minprice,
        decimal64 maxprice, decimal64 avgprice;

composite StockPriceAggregator {
graph
    // Read the transaction data from a file
    stream<TrxType> Transactions = FileSource() {
        param
            file : "TradesAndQuotes.csv.gz";
            format : csv;
            compression : gzip;
    }

// Aggregate statistics by ticker symbol
    stream<SummaryType> Summaries = Aggregate(Transactions)
    {
    window
        Transactions : partitioned, sliding,
            count(4), count(1);
        param partitionBy : ticker;
    output
        Summaries : ticker = Any(ticker),
            minprice = Min(price),
            maxprice = Max(price), avgprice = Average(price);
    }

// Write stream of aggregated data to file
    () as sinkPrefixSink = FileSink(Summaries) {
        param file : "SummaryData.csv";
    }
}
```

Existing Source Code Fragment 220A

```
stream<EmployeeRecordType> EmployeesDivision3 = Filter(AllEmployees)
{
    param filter : division == "research";
}
```

- *Type*
- *Stream*
- *Stream attribute*
- *Parameter value*

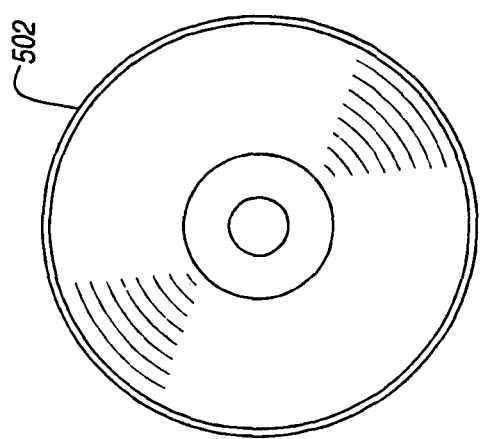
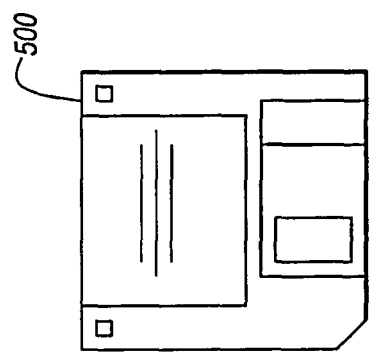
Fig. 16

SYSTEM AND METHOD FOR TRANSPLANTING SOURCE CODE

The present application is a continuation application of U.S. application Ser. No. 13/468,883, filed on May 10, 2012, the entire contents of which are incorporated herein by reference.

This invention was made with Government support under Contract No.: H98239-11-C-0276 awarded by Department of Defense. The Government has certain rights in this invention.

BACKGROUND OF THE INVENTION

1. Field of the Invention

The present invention generally relates to a method and system for transplanting source code, and more particularly to a method and system for automated code refactoring.

2. Description of the Related Art

In order to same time, many developers perform small-scale code reuse tasks. That is, many developers adopt existing source code, and integrate that existing source code or a fragment thereof into a new application. Generally, the existing source code expresses some required function, but many details must be manually changed in order to properly integrate the existing source code into the target source code of the new application.

FIG. 1 shows an example of how a conventional code reuse task is performed. Specifically, to adopt existing source code 120, generally a developer will copy the relevant fragment 130 of the existing source code 120 and then paste that fragment 130 into the target source code 110. After the developer pastes the fragment 130 of the existing source code 120 into the target source code 110, the developer is then required to perform a burdensome task of going through the fragment 130 and updating it so that it is able to be integrated with the target source code 110 of the new application.

A significant challenge of reusing code is identifying and correctly updating numerous change points, which are required to adapt existing code to the new application. Specifically, a given piece of source code may implement an algorithm or method, which has a general utility. Incorporating this piece of source code in another application typically requires the developer to manually locate and update change points between the reused piece of source code and the target application. For example, the developer may have to manually locate and update change points including, for example, type definitions, variable names, method names, and signatures.

Depending on the structure of the fragment of the existing code to be adapted, identifying at least the aforementioned change points may require a detailed understanding of not only how the reused piece of source code was used in the previous application, but also of how the reused piece of source code will interact with the target application. This level of detailed understanding may require substantial time and intellectual effort. Therefore, due to the small scale of such tasks, the actual time required, even for a relatively small-scale code reuse task, can quickly outweigh any perceived time saving benefit.

As is shown in FIG. 2, some development environments allow the developer to partially streamline this process. Specifically, in some integrated development environments (IDEs) a developer can manually select an individual token of a specific change point, e.g., "loadDocModel," and the IDE will automatically update all instances of code that invoke the function "loadDocModel" based on a single manual user input that renames this particular token. This process is commonly referred to as refactoring.

The automatic refactoring provided by IDEs is generally known to be more efficient than manual identification and individual updating of each token for each specific change point. However, even with an IDE that uses refactoring, the IDE is not aware that the transplanted code has been copied and pasted into the target source code. Instead, in order to successfully transplant the existing source code into the target source code of the new application, the developer must still manually identify the portions of the existing code that need to be changed and then update the identified portions of the existing source code.

Therefore, while automatic code refactoring can assist in the identification of the change points, the developer is still required to select the tokens to be changed and then enter replacement values for those tokens. As there may be many change points, this process is quite laborious and prone to error.

As a result, the present inventors have recognized that there is a need for a way to automatically identify portions of existing code which need to be updated, as well as a need for a way of suggesting updates to the existing code when it is integrated into the target application.

SUMMARY OF THE INVENTION

In view of the foregoing and other exemplary problems, drawbacks, and disadvantages of the conventional methods and structures, an exemplary feature of the present invention is to provide a method and system in which portions of existing code, which need to be updated to properly function with the target code of the target application, are automatically identified with suggestions for updating the existing code so that the existing source code may be able to be integrated into the target code of the target application.

It is another exemplary feature to provide a method and a system in which a fragment of the existing code is encapsulated, and an encapsulating change is generated.

It is another exemplary feature to provide a method and a system in which a measure of similarity between a change point in the existing code and a change point in the target code base is quantified, when the measure of similarity is above a predetermined threshold a suggestion for updating the existing code is offered.

To achieve the above and other features, in a first exemplary aspect of the present invention, described herein is a method and system for identifying existing code that needs to be changed, and suggesting updates when integrating the existing code into a target code base.

A second exemplary aspect of the present invention includes a system for integrating existing source code (or a fragment thereof) into target source code. The system includes a change point mapper that outputs a plurality of suggested candidate mappings between a change point of the existing source code (or the fragment thereof) and a plurality of change points of the target source code. In addition, the system includes a change point transformer that receives the plurality of suggested candidate mappings and outputs an updated existing source code (or an updated fragment thereof), the change point transformer being configured to automatically update the existing source code (or the fragment thereof) based on a selected candidate mapping of the plurality of suggested candidate mappings. The system also includes a change point transplanter being configured to insert the updated existing source code (or the updated fragment thereof) into the target source code.

Another exemplary aspect of the present invention includes a method of integrating an existing source code (or a fragment thereof) into a target source code. The method includes mapping a plurality of candidate mappings between a change point of the existing source code (or a fragment thereof) and a plurality of change points of the target source code. In addition the method includes selecting a candidate mapping of the plurality of candidate mappings and automatically updating the existing source code (or the fragment thereof) based on the candidate mapping having been selected. The method also includes transplanting the existing source code (or the fragment thereof) having been updated into the target source code.

The system and method of the present invention may be executed by a processor on a computer. The system may be a computer system including a central processing unit (CPU) and a memory unit. The memory unit may be used to store software for execution on the CPU. The software may include any of the segments of the present invention, for example, the parser, the change point identifier, the change point mapper, the change point transformer, the change point transplanter, and the Application Program Interface (API) generator. The segments may be stored in discrete portions of the memory.

Another exemplary aspect of the present invention includes a computer system for integrating existing source code into target source code, the system including an Application Program Interface (API) generator being configured to receive a plurality of change points of the existing source code and to generates an API including an input and an output based on a first and second change point of the plurality of change points of the existing source code, respectively, a change point mapper that outputs a plurality of suggested candidate mappings between the first change point of the plurality change points of the existing source code and a plurality of change points of the target source code, a change point transformer that receives the plurality suggested candidate mappings and outputs an updated target source code that invokes the API, the change point transformer being configured to automatically update the target source code based on a selected candidate mapping of the plurality of suggested candidate mappings, and a change point transplanter being configured to insert the updated target source code into the target source code.

Another exemplary aspect of the present invention includes a non-transitory tangible computer-readable medium embodying a program of machine-readable instructions executable by a digital processing apparatus to perform an instruction control method. The program integrates an existing source code (or a fragment thereof) into a target source code. The instruction control method includes mapping a plurality of candidate mappings between a change point of existing source code (or a fragment thereof) and a plurality of change points of the target source code. The instruction control method also includes selecting a candidate mapping of the plurality of candidate mappings and automatically updating the existing source code (or the fragment thereof) based on the candidate mapping having been selected. In addition the instruction control method also includes transplanting the existing source code (or the fragment thereof) having been updated into the target source code.

With the above and other unique and unobvious exemplary aspects of the present invention, it is possible to provide a method and a system that automatically identifies change points in both target code and existing code and determines which change points need to be updated. Likewise, it is possible to provide a method and a system that suggests updates to the existing code when it is integrated into the target code. These features of the present invention make it possible for a developer to automatically locate change points. Since the updates to the change points are suggested by the present invention, it is no longer necessary for the developer to have a detailed understanding of how the reused source code (or fraction thereof) was used in the previous application, and how that previous use will cause the reused piece of source code to interact with the target code. Hence, not only is the amount of time required for code reuse reduced by the present invention, but also the intellectual effort of the developer in adapting the existing code to the target application is also reduced.

In addition, this system may be realized as an extension to an IDE, where embedded utilities and Graphical User Interface (GUI) wizards provide the developer with interactive guidance on identifying and updating the change points required to transplant the existing code into the target code of an application. More specifically, the present invention provides a code transplanter, which may be embodied by a specialized compiler that creates a machine readable specification of the source code, algorithms that compare these specifications and identify change points, a code generator that creates methods that consolidate change points, and GUI wizards that guides the developer in implementing the required updates.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 1 shows an example of a conventional method of code reuse;

FIG. 2 shows an example of a conventional IDE refactoring tool;

FIG. 5 illustrates the identification of change points in the existing source code;

FIG. 11 illustrates an exemplary embodiment where a fragment of the existing code is selected to be encapsulated;

FIG. 13 illustrates an exemplary embodiment here the API is generated using the fragment selected in FIG. 11;

FIG. 16 illustrates storage media that may be used in conjunction with the typical configuration of FIG. 15.

Figure 3:
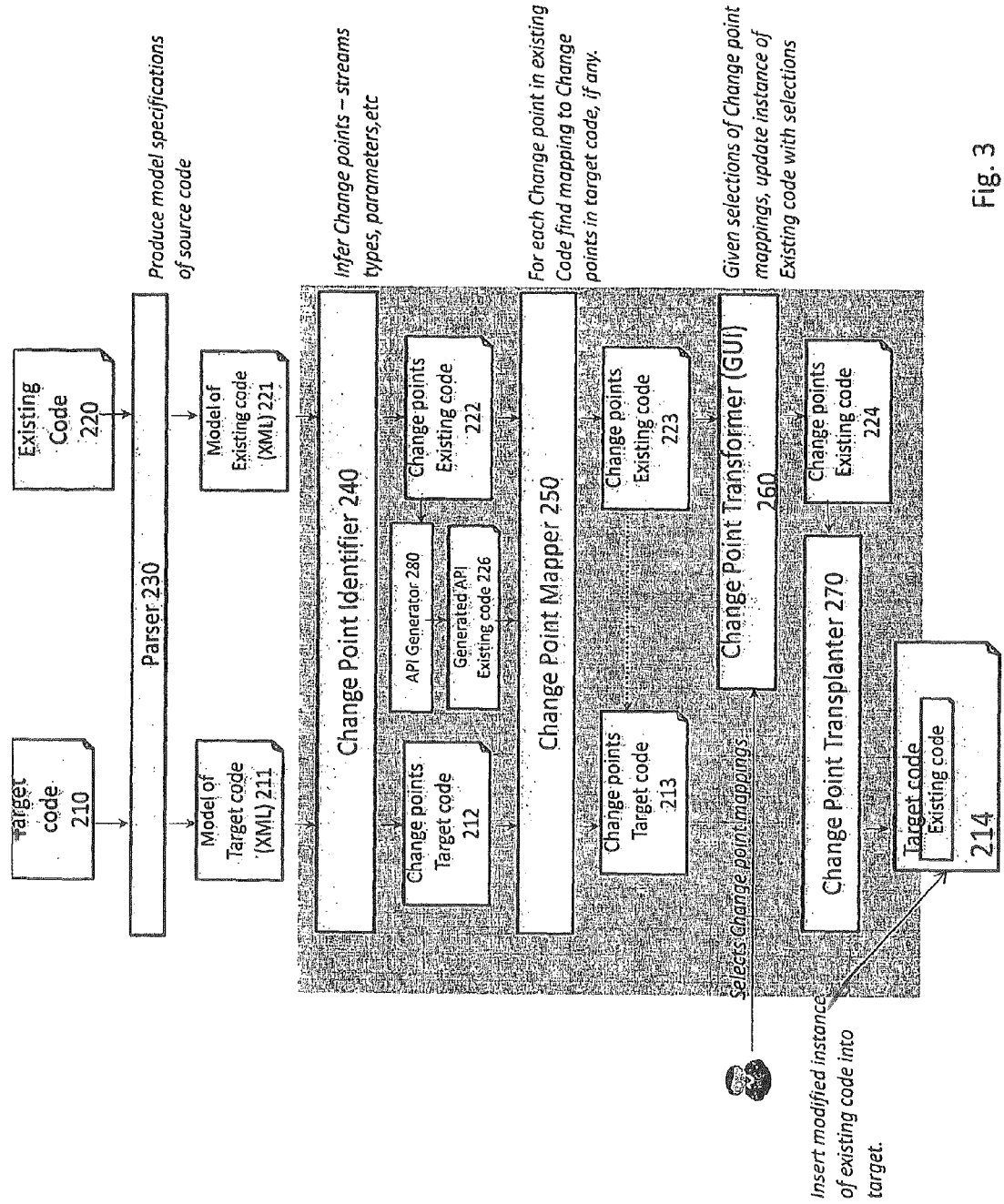
FIG. 3 illustrates a flow chart of an exemplary embodiment of the claimed invention.

DETAILED DESCRIPTION OF EXEMPLARY
EMBODIMENTS OF THE INVENTION

Referring now to the drawings, and more particularly to FIGS. 3-16, there are shown exemplary embodiments of the method and structures according to the present invention.

FIG. 3 shows a flow chart of an exemplary embodiment of the present invention. This exemplary embodiment of the present invention includes a parser 230, a change point identifier 240, a change point mapper 250, a change point transformer 260, and a change point transplanter 270. The parser 230 is configured to receive as inputs target code 210 and existing code 220, and to output a model of the target code 211 and a model of the existing code 221. The change point identifier 240 is configured to receive as inputs the model of the target code 211 and existing code 221, and to infer and output change point(s) of the target code 212 and change point(s) of existing code 222. The change point mapper 250 is configured to receive as an input the change points 212 and 222. For each change point 222 in the existing code 220, the change point mapper 250 finds possible mappings, if any, to change points 212 in the target code 210. The change point mapper 250 outputs the mapped candidate change points of the target code 213, and the change points of the existing code 223 having possible mappings to the candidate change points 213 of the target code 210. The change point transformer 260 is configured to receive the possible mappings of change points between the existing code 220 and the target code 210, and to update the mapped change points of the existing code 223 based on one or more inputs. The change point transformer 260 outputs the updated change points of the existing code 224 to the change point transplanter 270. The change point transplanter 270 generates a derivative existing code (or a fragmentation thereof) 214 and places it at a selected location (FIG. 4) in the target code 210.

Figure 4:
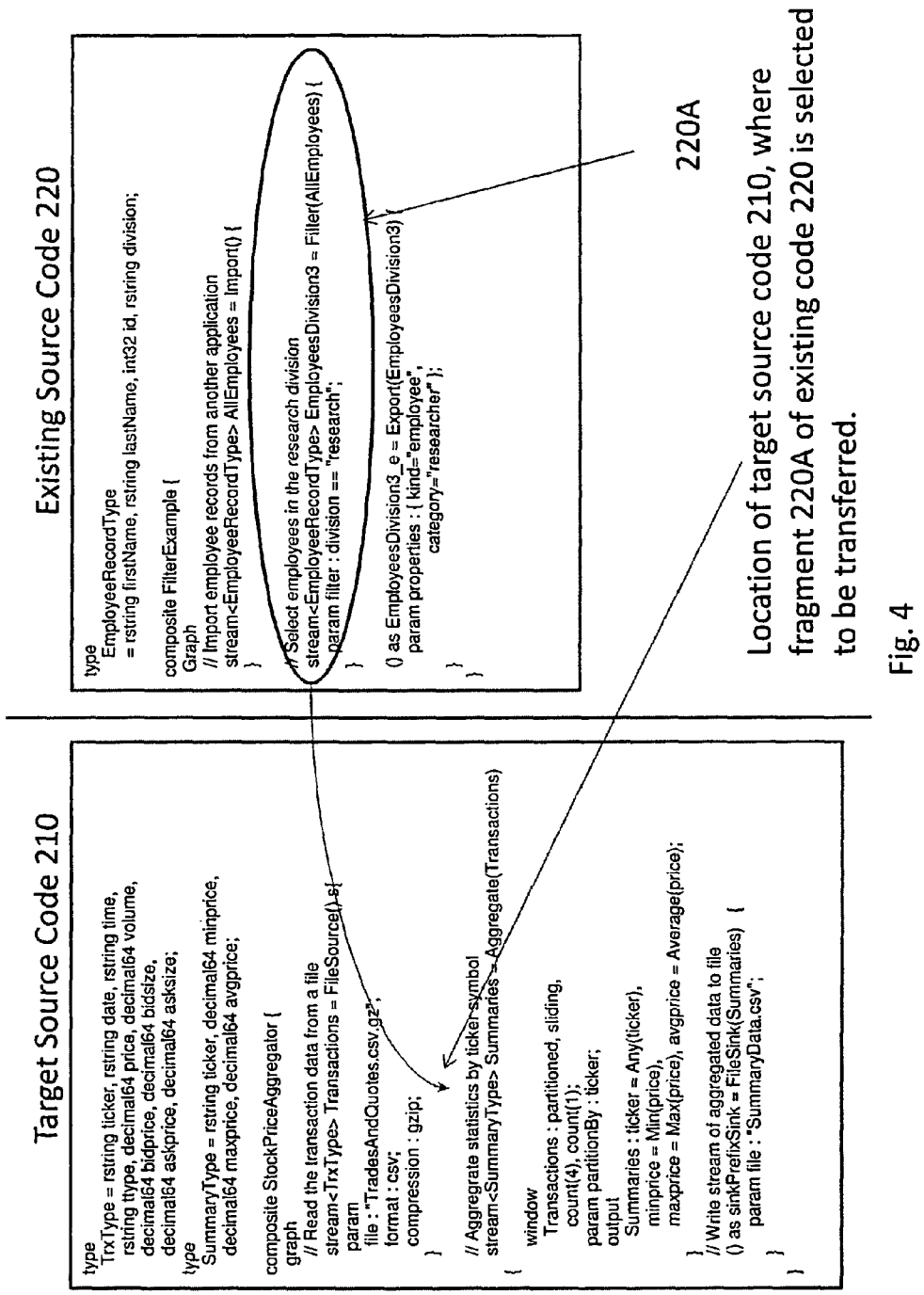
FIG. 4 illustrates the selection of a transplant location in the target code.

Specifically, as is shown in FIG. 4, the target code 210 is the code which is to be modified, and is an instruction or a set of instructions that are specified in a programming language. The existing code 220 (or fragment thereof 220A) is the code which has a desired functionality, and is the code to be transplanted into the target code 210. The programming language shown in FIG. 4 (and somewhat similarly shown in the other Figures of the present invention) is merely for illustration purposes and not intended to be construed as limiting.

The parser 230, which may be any parser known in the art, is configured to receive the target code 210 and the existing code 220. Preferably the fragment 220A of existing code 220 is identified before the existing code 220 is input into the parser 230. The fragment 220A is assumed to be syntactically complete, e.g., no partial tokens or expressions, and syntactically correct. Similarly, it is preferable that the location of the target source code 210 where the existing code 220 (or the fragment thereof 220A) is desired to be transplanted is identified before the target code 210 is input into the parser 230. By transplanting only a fragment 220A of the existing source code 220, only the desired functionality of the existing source code 220 is transplanted into the identified location of the target source code 210.

Referring back to FIG. 3, the parser 230 receives the target code 210 and the existing code 220, and decomposes the target code 210 into its essential elements. Next the parser 230 generates a model of the target code 211 using the essential elements. This model 211 describes the abstract syntax of the target code 210. Preferably the model of the target code 211 is an abstract syntax tree encoded using Extensible Markup Language (XML). This feature allows a particular element of the abstract syntax tree to be directly accessed after the target code 210 has been parsed.

More specifically, the essential elements of the target code 210 include, for example, operators, streams, parameters, attributes and types. These do not imply a restriction, but are simply the essential elements used in an exemplary embodiment of the present invention. These elements are generally equivalent to function, variable, arguments and types for procedural programming languages. The decomposed essential elements are preferably formed into an abstract syntax tree. This abstract syntax tree is a list of the essential elements of the target code 210 and their relationship to one another.

Likewise, the parser 230 decomposes the existing code 220 into its essential elements, and generates a model of the existing code 221. This model 221 describes the abstract syntax of the existing code 220. Preferably the model of the existing code 221 is an abstract syntax tree encoded using XML.

More specifically, the essential elements of the existing source code 220 include, for example, operators, streams, parameters, attributes and types. These do not imply a restriction, but are simply the essential elements used in an exemplary embodiment of the present invention. These elements are generally equivalent to function, variable, arguments and types for procedural programming languages. The decomposed essential elements are preferably formed into an abstract syntax tree. Similar to the above, the abstract syntax tree is a list of the essential elements of the existing code 220 and their relationship to one another.

The parser 230 then outputs the abstract syntax tree model of the target code 211 and the abstract syntax tree model of the existing code 221. As noted above these abstract syntax tree models 211 and 221 describe the abstract syntax of the target code 210 and existing code 220, respectively. The abstract syntax tree models 211 and 221 are then input into the change point identifier 240.

The change point identifier 240 receives the abstract syntax tree models 211 and 221 and then infers change points, e.g., streams, types, parameter values, stream attributes, etc., in both the target code 210, as well as, the existing code 220.

The change point identifier 240 automatically infers the change points 212 and 222 by traversing each of the respective abstract syntax tree models 211 and 221, and constructs a list of each of the names of the programming language elements. Each entry in this list is a tuple consisting of the element name, and the type of the programming language element, e.g., (<element name>, <element type>).

FIG. 5 illustrates the identification of change points 222 in the existing source code 220. Specifically, as shown in FIG. 5, the change point identifier 240 is identifying change points 222 (attributes of the particular language) e.g., shown as type, stream, stream attribute and parameter value, of the fragment 220A of the existing source code 220. The change point identifier 240 identifies all of the change points 222 in the existing code 220 (or fragment thereof 220A) that need to be changed in order to transplant the existing code 220 (or fragment thereof 220A) into the identified location of the target code 210.

In the same manner, the change point identifier 240 identifies change points 212 of the target source code 210. Since, this feature is performed in the same manner as that described above with regard to the existing source code 222, a redundant discussion of this feature has been omitted.

Depending on the language(s) in which the target code 210 and existing code 220 is written, the attributes (e.g., change points) may be different. Hence, other types of change points may be identified by the change point identifier 240 and the aforementioned change points are simply provided as a non-limiting example that shows a change point identifier 240 is identifying change points 222 (212).

After the change point identifier 240 automatically identifies the change points 222 and 212 of the existing code 220 and the target code 210, respectively, the change points 222 and 212 are input into the change point mapper 250.

To reduce the change points 212 and 222 of the target code 210 and existing code 220, respectively, that are that are input into the change point mapper 250, the change point identifier 240 preferably limits the set of change points 212 and 222 input into the change point mapper 250 to the change points 212 and 222 that are boundary change points.

In an exemplary embodiment of the present invention, for the target source code 210, if a change point 212 of the target source code 210 is referenced by and not produced by the target source code 210, then that change point 212 is classified as a boundary change point. Similarly, if a change point 212 is produced by and not referenced by the target source code 210, then that change point 212 is classified as a boundary change point.

Likewise, for the existing source code 220, if a change point 222 of the existing source code 220 is referenced by and not produced by the existing source code 220, then that change point 222 is classified as a boundary change point. Similarly, if a change point 222 is produced by and not referenced by the existing source code 220, then that change point 222 is classified as a boundary change point.

For example, as is described above, after the parser 230 produces the abstract syntax tree models 211 and 221, the change point identifier 240 traverse the models 211 and 221, and constructs a list of all the names of the programming language elements. Each entry in the list is a tuple consisting of the element name, and the type of the programming language element. To reduce the change points 212 and 222 that are input into the change point mapper 250, the change point identifier 240 identifies boundary change points of the change points 212 and 222 based on the abstract syntax tree models 211 and 221, respectively.

As is noted above, when a change point 212 or 222 is referenced or produced by code outside of the existing source code fragment 220A that has been selected, then the change point 212 or 222 is classified as a boundary change point.

For example, the change point identifier 240 construct a set of change points 212, from the target source code 210 in FIG. 4, to be input into the change point mapper 250. The change point identifier 240 identifies, based on the abstract syntax tree model 211, that "TrxType" is a name of a language element that defines a type in the programming language. The tuple added to the list to identify this change point 212 would be ("TrxType", type). Other change points 212 in the target source code 210 in FIG. 4 include, but are not limited to, ("SummaryType", type), ("StockPriceAggregator", composite), ("Transactions", stream), and ("file: SummaryData.csv", param). The resulting list would exclude elements that are reserved or built-in to the language, such as type, stream, composite, param, Filter, filter, graph, ==, partitioned, sliding, etc. in the example language referenced by this exemplary embodiment of the present invention.

Therefore, since the change point 212 ("file: SummaryData.csv", param) of the target code 210 is both produced and referenced by the target code 210, it would not qualify as a boundary change point. Accordingly, this change point 212 would not be input into the change point mapper 250.

Once the change point identifier 240 computes the lists of change points 212 and 222 to be input into the change point mapper 250, then the change point identifier 240 outputs the respective lists to the change point mapper 250.

For each boundary change point 222 in the list derived from the existing code fragment 220A, the change point mapper 250 computes a possible mapping to the list of change boundary points 212 derived from the target source code 210, where the boundary change point 222 in the existing code fragment 220A matches the type of the change points 222 in the target code 210.

For example, referring to FIG. 4, the change point 222 ("EmployeeDivision3", stream) in the Existing Source Code fragment 220A, the change point mapper 250 searches the list of boundary change points 212 produced from the target source code 210. In the list of the change points 212 for the target source code, the change point mapper 250 determines that where are two tuples where the element type equals "stream", e.g., ("Transactions", stream) and ("Summaries", stream). These tuples comprise the candidate change point mappings from the target code 210 to the EmployeeDivision3 stream in the existing code fragment 220A.

In the same manner, the change point mapper 250 automatically creates the possible mappings (e.g., candidate change point mappings) from the target code 210 to the existing code fragment 220A, for each change point 222 of the existing code 220 that has been input into the change point mapper 250. That is, for each change point 222 of the existing code 220, the change point mapper 250 automatically creates a possible mapping, if any, to the change points 212 of the target code 210 that have been input into the change point mapper 250. Each change point 212 of the target code 210 that the change point mapper 250 creates a possible mapping to is referred to as a candidate change point 213 for that particular change point 223 of the existing code 220.

As noted above, the change point mapper 250 determines possible mappings by forming pairs of change points. Specifically, each change point 223 of the existing source code 220 is paired with each candidate change point 213 of the target source code 210 having the same change point type of change point 223 of the existing source code 220. However, matching on type only preferred, but not necessary. That is, there are other features within the existing source code 220 and target source code 210, which may be used as the indication of a possible match. Using type to filter the possible matches reduces the number of options presented to the user thereby reducing the required intellectual effort.

The change point mapper 250 then computes a measure of similarity between each change point in the change point pair. When the measure of similarity is above a predetermined threshold, then the change point mapper determines that the candidate change point 213 of the target code 210 can be mapped to the change point 223 of the existing code 220. That is, each change point pair that is above the predetermined threshold is considered to be a suggested candidate mapping by the change point transformer 260.

The candidate change points 213 having been determined as possible mappings to each change point 223 of the existing code have tokens, these tokens of the candidate change points 213 are the possible replacements for the tokens of the mapped change point 223 of the existing code 220.

When multiple candidate change points 213 are mapped to a particular change point 223 of the existing code 220, preferably the change point mapper 250 filters the number of candidate change points 213 available for mapping to the particular change point 223 of the existing source code 220.

For example, in order to reduce the number or ranking between particular change point pairs above the predetermined threshold, the similarity of the candidate change points 213 and change points 223 can be computed by, for example, comparing structured type definitions and then filtering out the mappings that are of dissimilar structured type definitions. Likewise, the number of mappings for particular change point pairs can be reduced by computing a ratio of the total number of types in a type definition to the number of types that are the same in each of the type definitions for that particular pair of change points. The lower the ratio, the higher the similarity between the particular pair of change points will be considered. This reduction in the number of possible change point mappings can be performed either separate or in conjunction with the above mentioned filtering of possible change point mappings.

Using one or both of these ranking/filtering mechanisms, the number of possible change mappings can be reduced. Therefore, a potential list of candidate mappings of change points can be modified (e.g., filtered and/or ordered) to prefer the most likely mappings. Accordingly, the developer can spend less time considering the possible change point mappings. This feature even further lower the amount of time and intellectual effort required by the developer. As a result, this feature of the present invention may allow the process of reusing source code to be made even more efficient.

Furthermore, alone or in combination with the methods of reduction/filtering discussed above, the number of possible change point mappings can be reduced by identifying, in the change point mapper 250, change points 223 that are positioned on a boundary of the existing code 220. Specifically, if a change point 223 of the existing code 220 is referenced by and not produced by the existing code 220, then that change point 223 is classified as a boundary change point. Likewise, if the change point 223 is produced by and not referenced by the existing code 220, then the change point 223 is classified as a boundary change point. Filtering and/or ordering the potential change point mappings to prefer boundary change points can help to further reduce the number of possible candidate mappings that have to be considered by the developer.

Furthermore, alone or in combination with any or all of the reduction/filtering methods discussed above, the number of candidate change point mappings can be even further reduced by using previous mapping selections to guide subsequent mapping suggestions. Specifically, each selected mapping between the change point pairs 223 and 213 is recorded on a memory or on a disk. When a subsequent mapping selection is made, the ordering and/or filtering prefers a mapping between a change point 223 of the existing code 220 and a candidate change point 213 in the target code 210 by computing a subset of change points 223 in the existing code 220, where each change point 223 of the subset of change points is substantially similar to the change points 222 in the fragment 220A of the existing code 220. In other words, previous mapping selections are recorded, and used to filter/rank subsequent mapping selections.

The change point mapper 250 removes each change point 212 of the target code 210 having previously been mapped to a change point 222 of the subset of change points, from the possible candidate change points 213 that are available to be mapped to the remaining change points 223. Therefore, once a mapping is selected, it is removed from the set of candidate mappings. As a result, this feature reduces the number of candidate change points 213 available to be mapped to, and thus considered by the developer.

Figure 6:
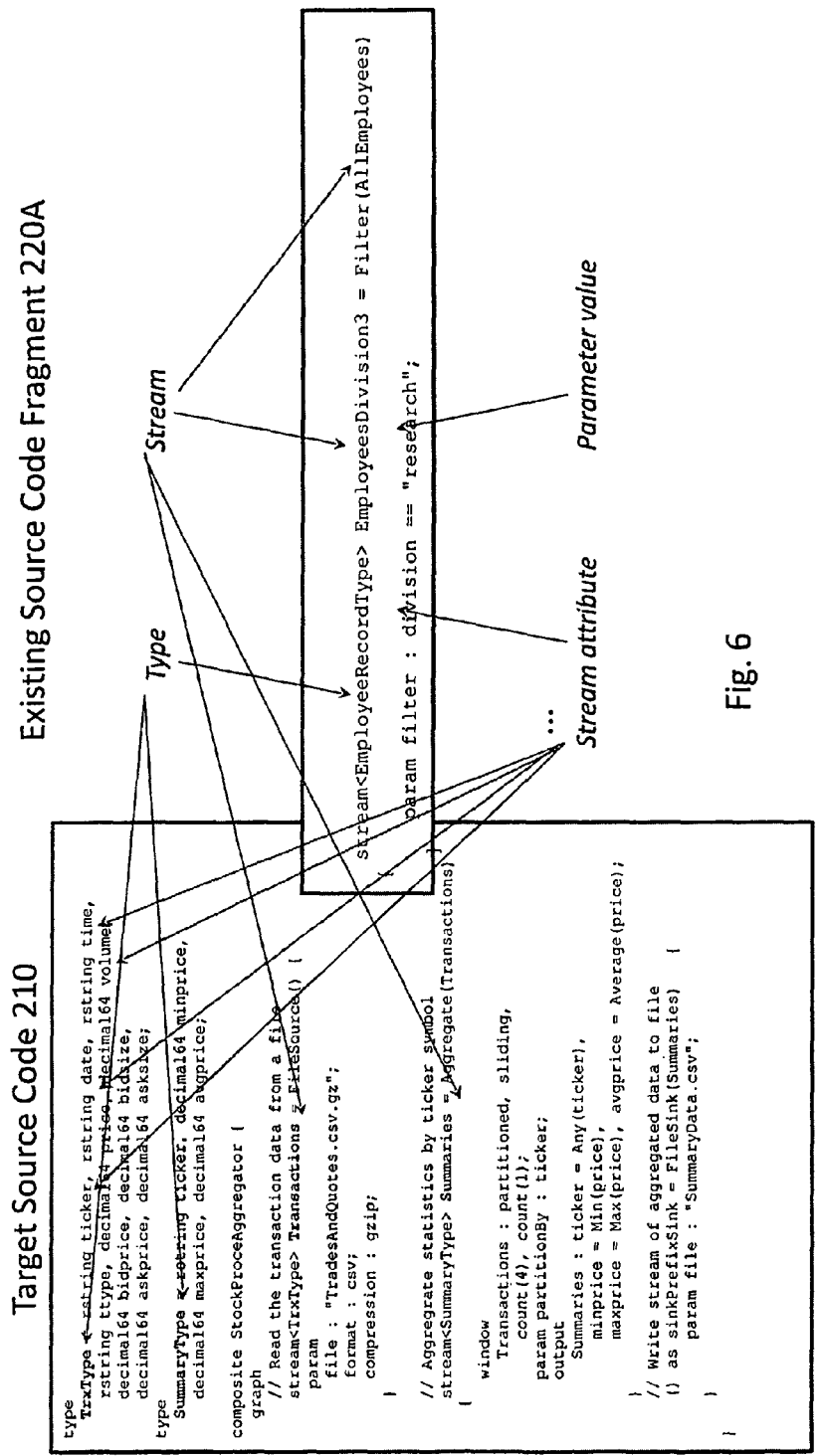
FIG. 6 illustrates the identification of the candidate change points in the target source code.

FIG. 6 illustrates the identification of the candidate change points 213 in the target source code 210 with the change points 223 of the fragment 220A of the existing code 220. Specifically, for each change point 223 in the existing source code 220, the change point mapper 250 identifies the possible corresponding candidate change points 213, if any, in the target code 210.

The change points 223 having been mapped to the possible candidate change points 213 are then input into the change point transformer 260. Preferably, the change point transformer 260 includes a GUI. This feature may help guide the developer through the procedure selecting a specific change point mapping of the between the candidate change point 213 and the change point 223 of the existing code 220. That is, with a GUI the developer is able to select which candidate change point 213, if any, corresponds to a change point 223 of the existing source code 220. This feature may be particularly useful when there are many possible change point mappings detected by the change point mapper 250.

The change point transformer 260 is configured to receive an input for selecting a change point mapping, if any, between a candidate change point 213 and a particular change point 223 of the existing code 220. Given the selections of change point mappings, the change point transformer 260 automatically updates each instance of a token of the change point 223 of the existing code 220 with a token of the selected candidate change point 213.

FIG. 6 illustrates an example of the change point transformer 260 where change point transformer 260 selects a mapping between the candidate change point 213 and the change point 223, based on an input. Specifically, the change point transformer 260 receives an input for selecting a mapping, if any, for each change point pair 223 and 213. As is shown in FIG. 6, the type candidate change points 213 "TrxType" and "SummaryType" of the target code 210 have been mapped to the type change point 223 "EmployeeRecordType" of the existing code 220. Similarly, the stream candidate change points 213 "Transactions" and "Summaries" have been mapped to the stream change point 223 "AllEmployees" and "EmployeeDivision3" of the existing code 220.

Figure 7:
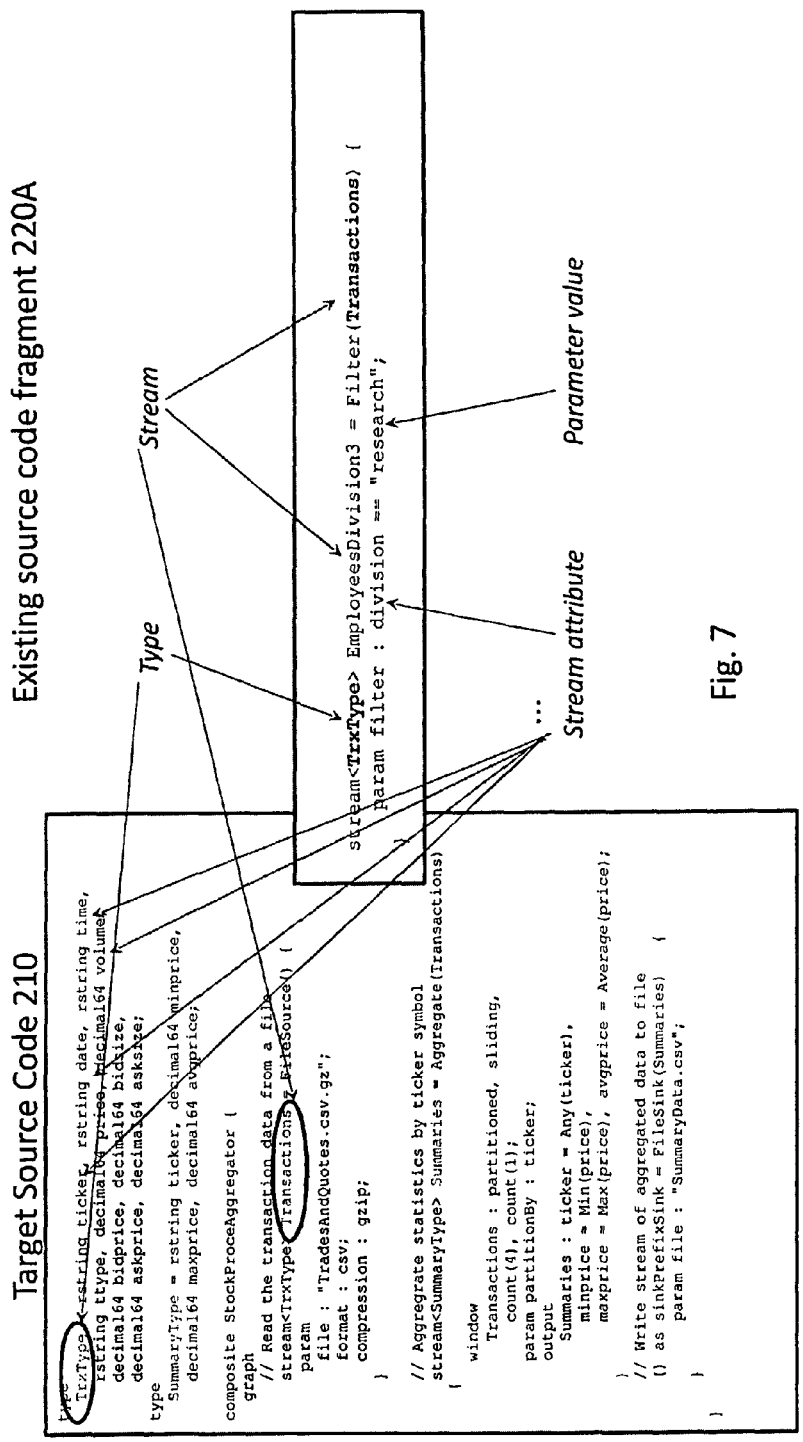
FIG. 7 illustrates an exemplary embodiment where the tokens of the candidate change points from the target code replace the respective tokens of the change points in the existing code.

Based on inputs to the change point transformer 260, the change point transformer 260 then replaces the tokens of the respective change points 223 in the existing source code 220 with the tokens of the respective selected candidate change points 213 of the target code 210. For example, as is shown in FIG. 7, the token "EmployeeRecordType" of the existing code 220 is replaced with the token "TrxType" of the target code 210. Somewhat similarly, the token "AllEmployees" of the existing code 220 is replaced with the token "Transactions" of the target code 210.

In addition, the change point transformer 260 allows for additional editing of the existing code 220. Specifically, the tokens of additional unmapped change points 222 can be updated to accommodate the desired function of the target application of the target code 210.

Figure 8:
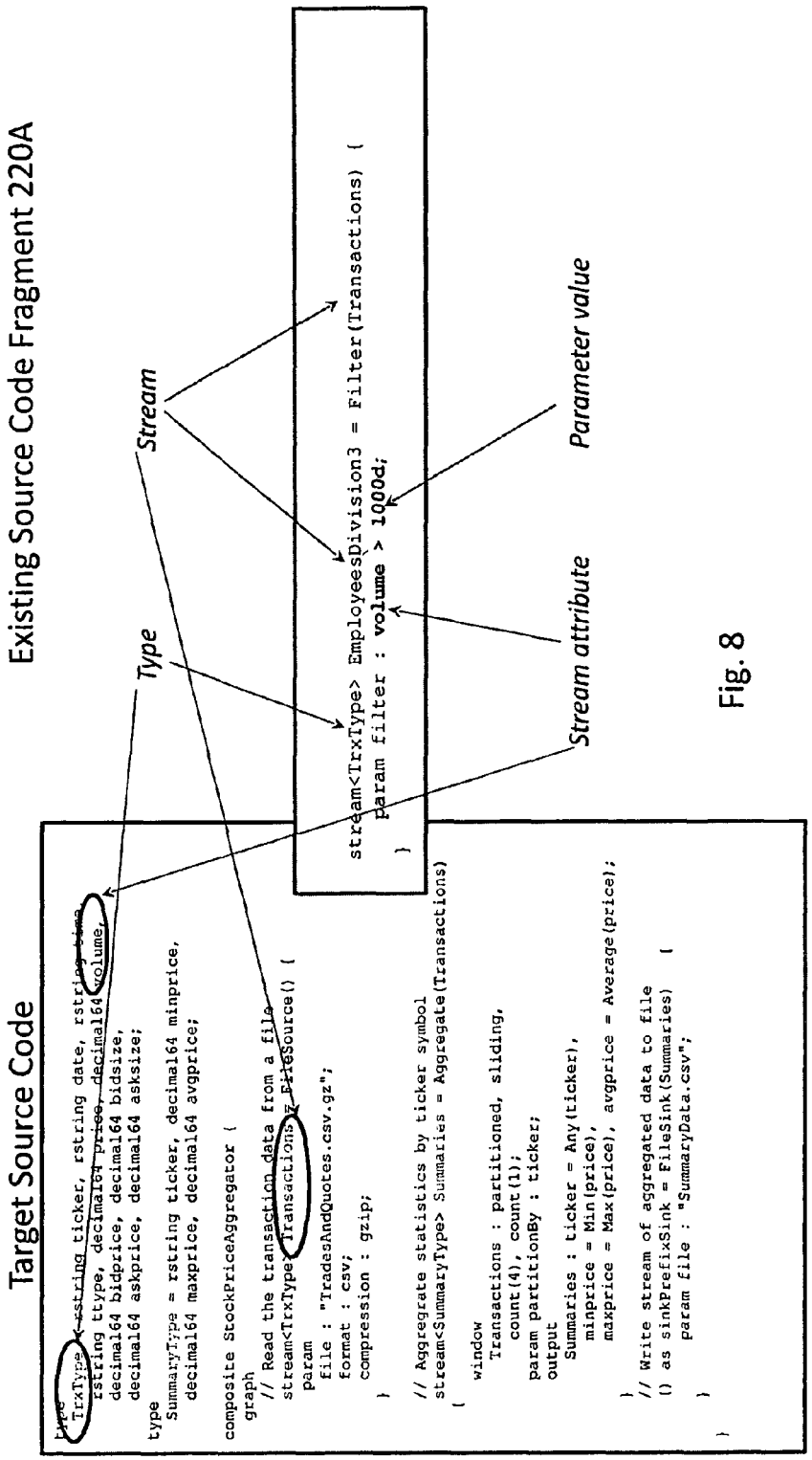
FIG. 8 illustrates an exemplary embodiment where the existing code is able to be edited by the change point transformer.

FIG. 8 illustrates an example of this feature. Specifically, this example shows that the stream attribute of the filter function of the existing code 220 is updated in the change point transformer 260. That is, rather than filtering on the token "division==research" as originally provided in the existing code 220 and shown in FIG. 6, the filter operation is updated with the token "volume>1000 d" based on an input to the change point transformer 260. This feature makes it easier to achieve the desired result of the target application of the target code 210.

Figure 9:
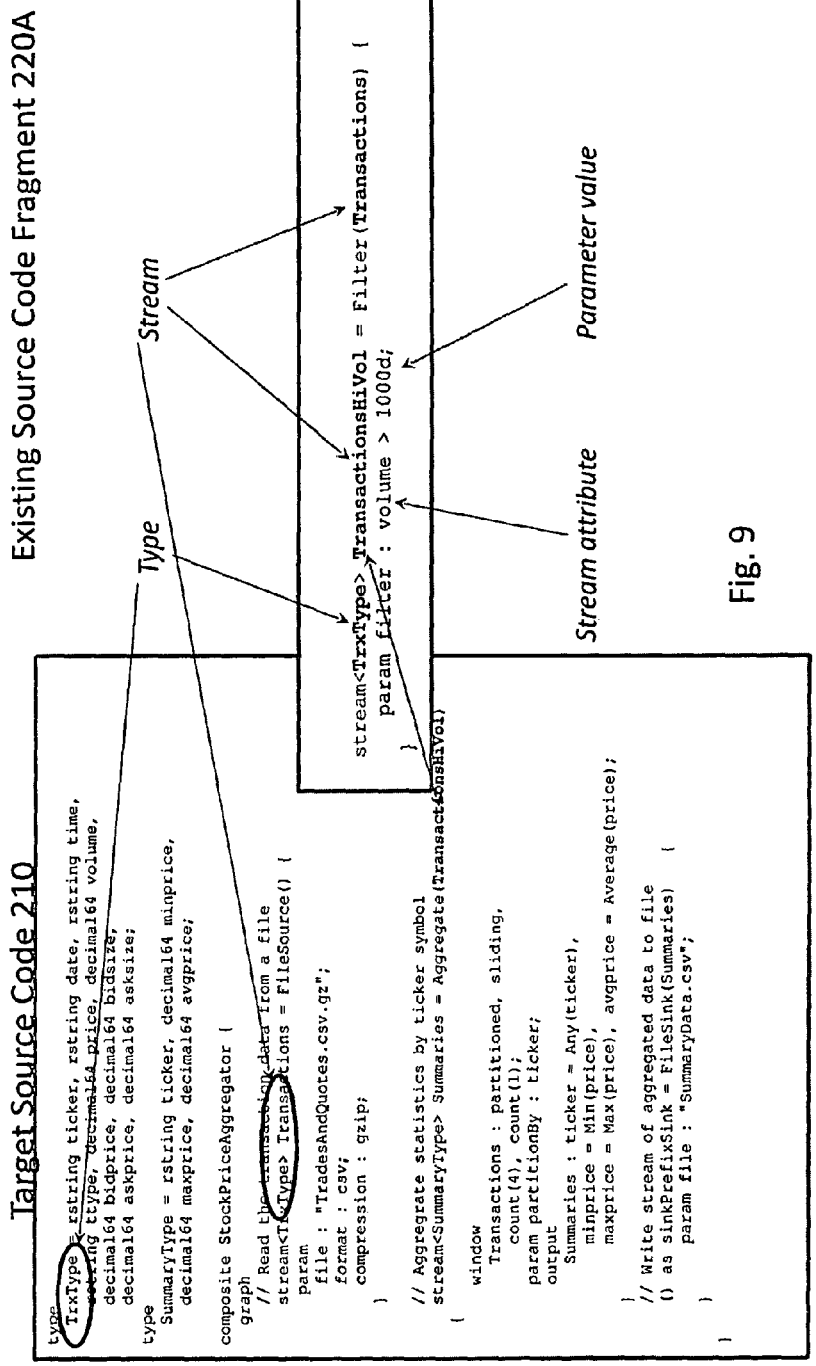
FIG. 9 illustrates an exemplary embodiment where the tokens in the target source code are updated to accommodate changes in to the change point in the existing source code.

In addition, the change point transformer 260 allows the updating of tokens in the target source code 210, because changes to respective change points 212 of the target source code 210 may require these tokens to be updated in order to conform updated target code 210. For example, as is shown in FIG. 9, the token of the filter operation in the existing code 220 has been updated to "volume>1000 d", therefore it may be desirable to change the token "transaction" in the target code 210 to "TranscationsHiVol." That is, the change point transformer 260 allows the user to update the tokens in the target code 210 to accommodate changes to change points 212 in the target code.

The updated existing code 214 is then input into the change point transplanter 270. The change point transplanter 270 places the updated existing code 214 into the target code 210.

Moreover, the change point transplanter 270 is also configured to receive and/or store external constraints and additional requirements before transplanting the updated existing code 224 into the target code 210. For example, these external constraints and additional requirements may include, by way of non-limiting examples, industry specific coding standards, in house coding standards, user specified coding standards, programming language specific best practices, etc. When the change point transplanter 270 is provided with external constraints and or requirements, the change point transplanter 270 prevents the updated existing code 224 from being transplanted into the target code 210. Specifically, the change point transplanter 270 can perform a code check on the existing code 224 before inputting it into the target code 210, if the existing code fails to comply with the constraints and or requirements then the change point transplanter 270 may provide the developer with such a warning or may prevent the updated existing code 224 from being transplanted into the target code 210.

That is, if the transplantation of the updated existing code 224 will cause the otherwise compliant target code 210 to become incompliant with the external constraints and/or requirements the change point transplanter may prevent the updated existing code 224 from being input into the target code. This feature helps to ensure that the automatically transformed code complies with the requirements and/or constraints that are required and/or desired for the target application of the target code 210.

In another exemplary embodiment of the present invention, the number of change points 223 exposed by the existing code 220 may be reduced. This allows the present invention to more easily create a reusable module of the existing code.

Figure 10:
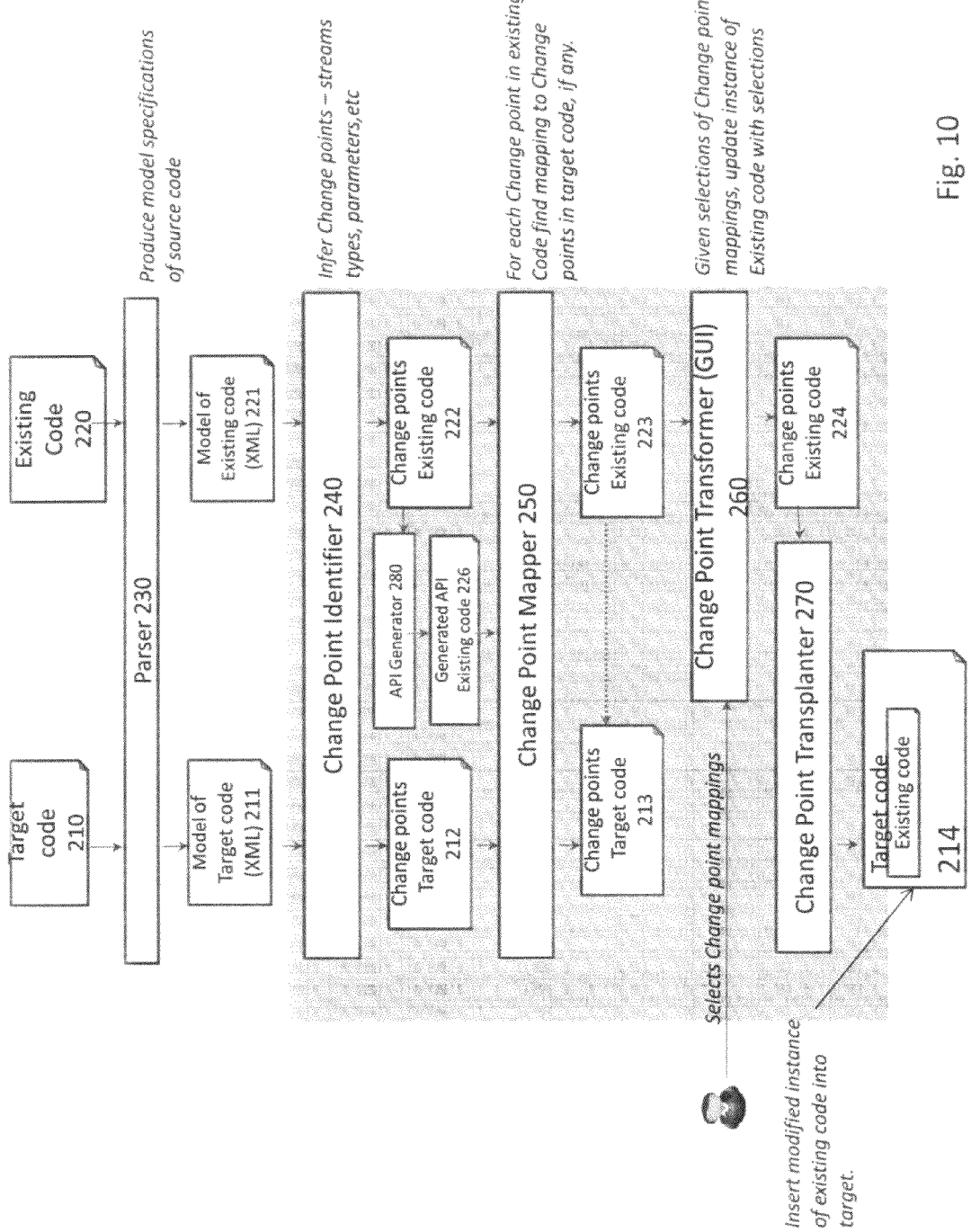
FIG. 10 illustrates a flow chart of another exemplary embodiment of the claimed invention having an API generator.
Figure 11:
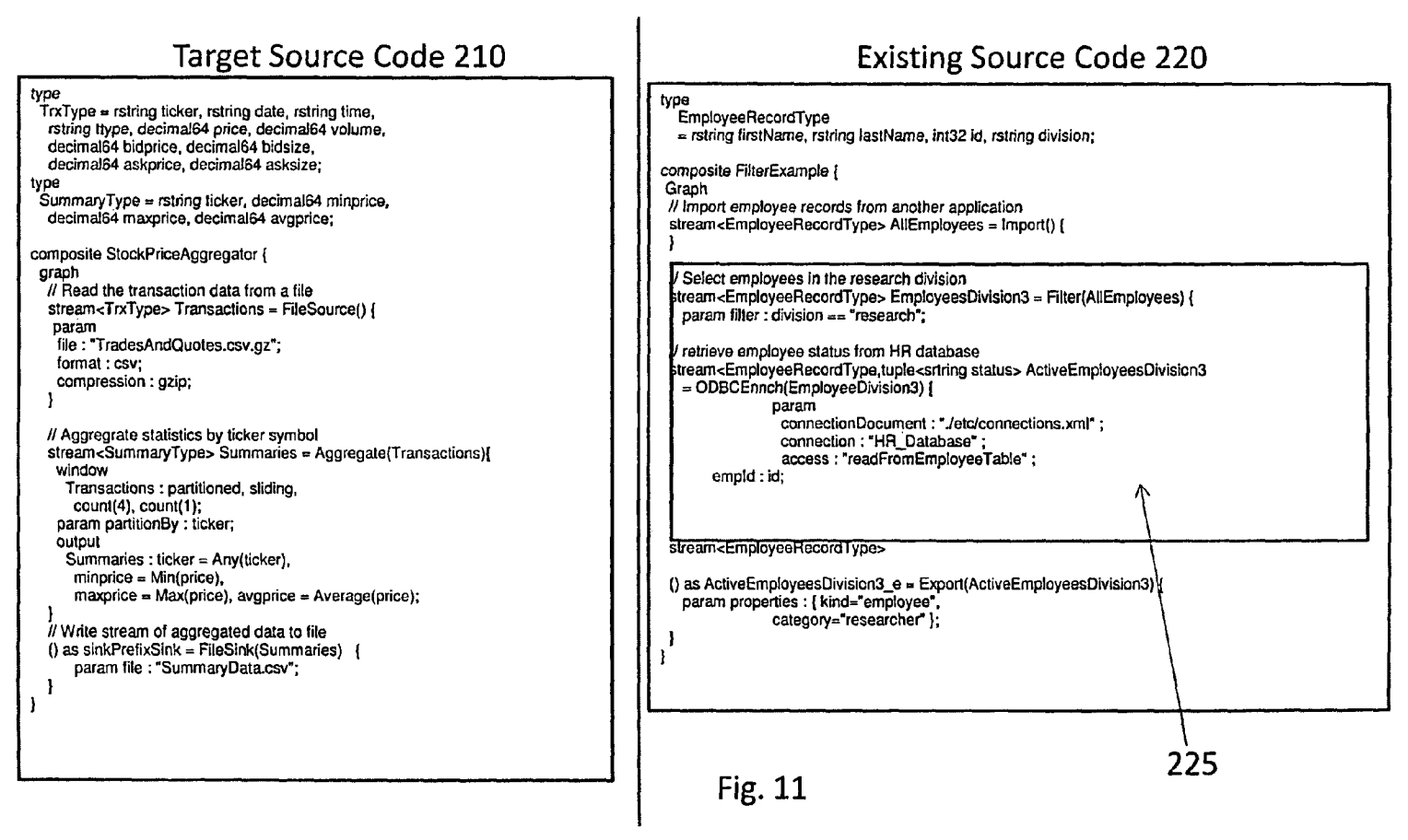

Specifically, as is shown in FIG. 10, a system similar to that of FIG. 3 is provided. A redundant discussion of the common elements between these two systems has not been provided. In addition to the common features of the system shown in FIG. 3, the system shown in FIG. 10 also provides an Application Program Interface (API) generator 280 that generates an API 226 of the existing code 220. In this embodiment, the change point identifier 240 outputs the change points 222 of the existing code 220 to each of the change point mapper 250 and the API generator 280. The API generator 280 generates an API 226 of the existing code 220. The API 226 of the existing code 220 is output by the API generator 280 and input to the change point mapper 250. Therefore, in this exemplary embodiment, the change point mapper 250 receives the change points 212 of the target code 210, the generated API 226 of the existing code 220, and the change points 222 of the existing code 220. As is shown in FIG. 11, a fragment 225 of the existing code 220 is selected by be encapsulated. This may be done using a GUI. In addition, this may be done by identifying a start and end line of the existing code 220 to be encapsulated. The fragment 225 may be encapsulated in an API 226.

After the fragment 225 of the existing code 220 is selected to be encapsulated, external candidate change points 222 in the fragment 225 are identified using the change point identifier 240. This is performed in the same manner as discussed above.

Figure 12:
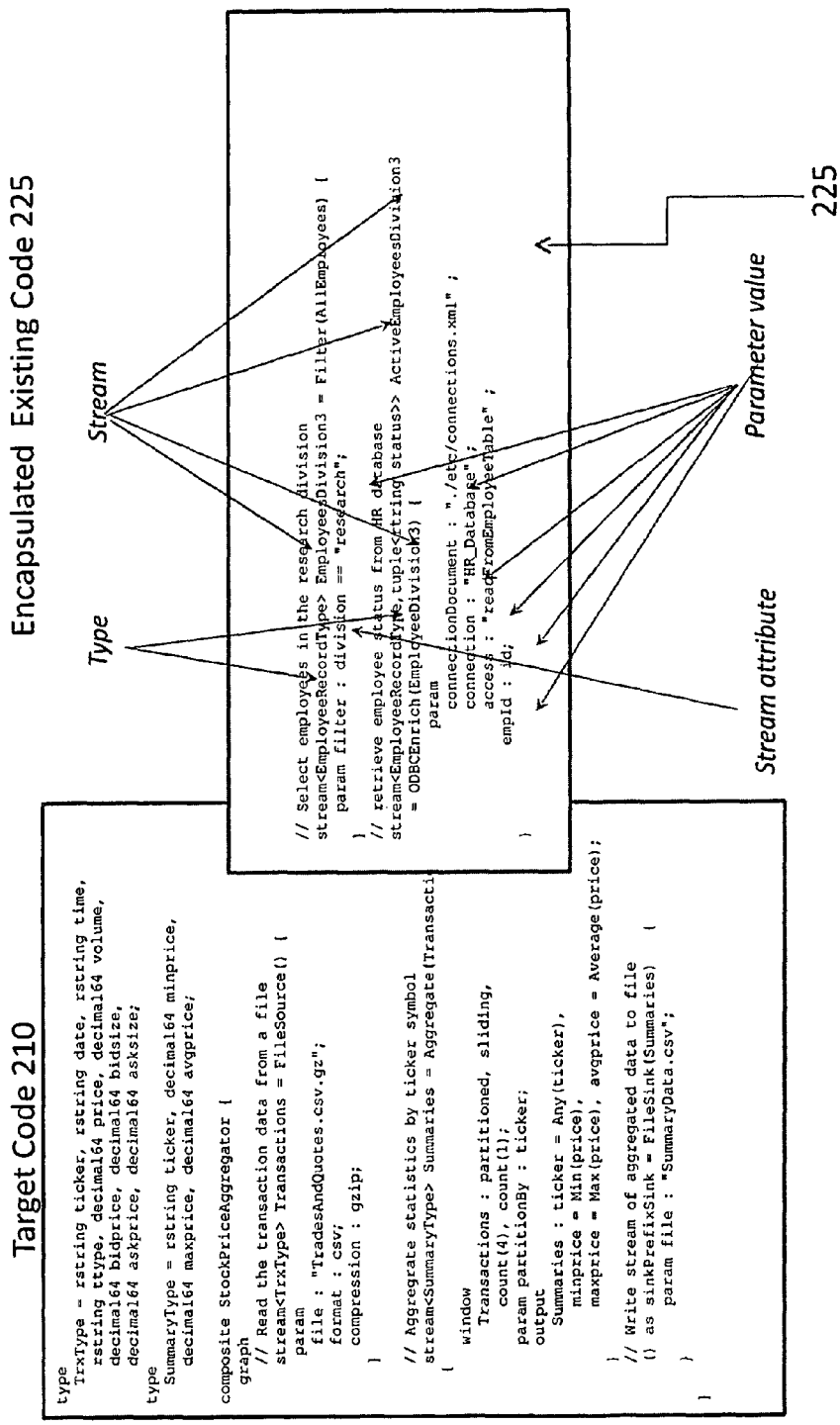
FIG. 12 illustrates an exemplary embodiment where the candidate change points, in the fragment selected in FIG. 11, are identified and able to be selected.
Figure 14:
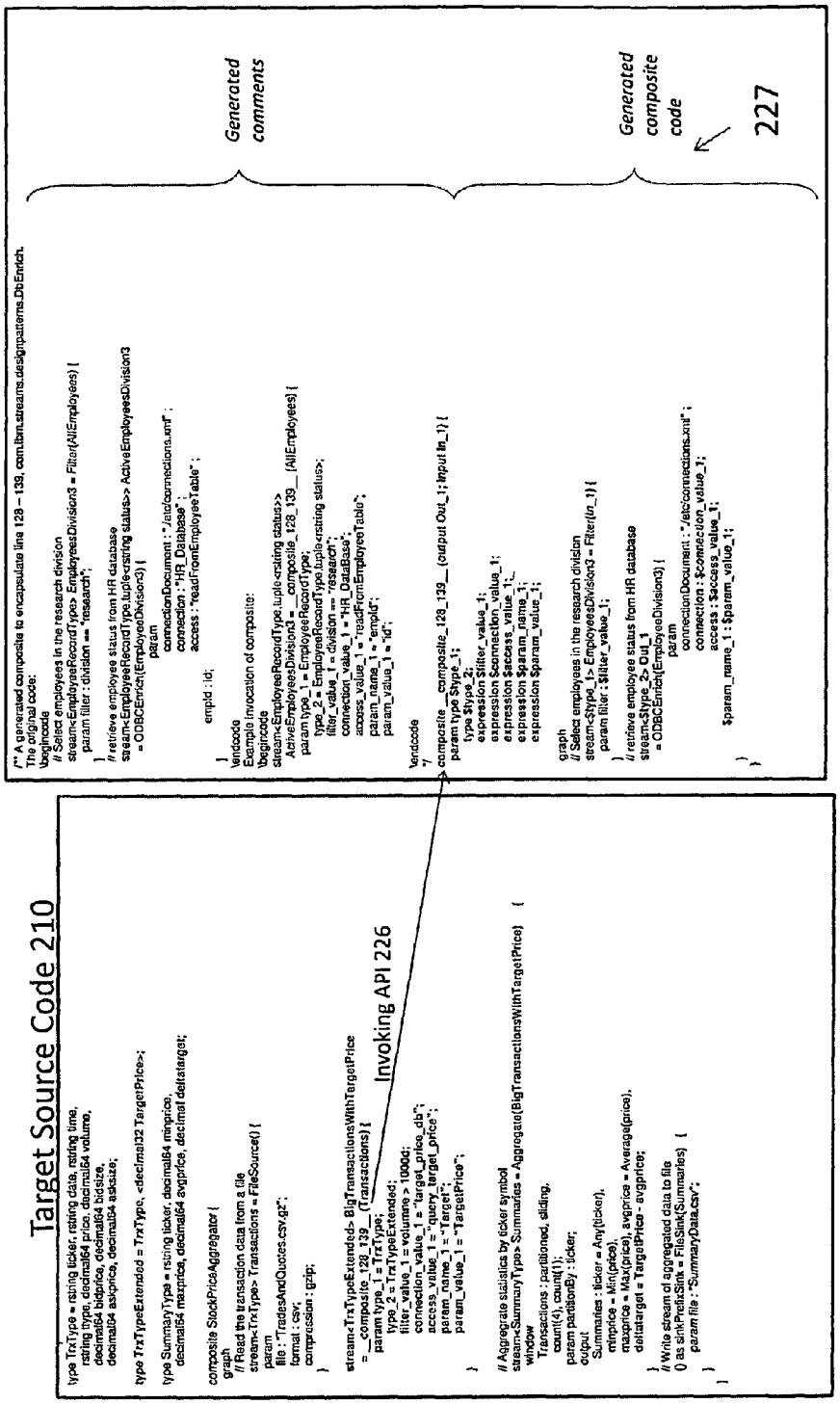
FIG. 14 illustrates an exemplary embodiment where the target source code is updated to invoke the API generated in FIG. 13.

FIG. 12 shows an example of the fragment 225 being analyzed by the change point identifier 240. Similar to the teachings above, the change points 222 of the fragment 225 are inferred. However, the change point identifier 240 analyzes the fragment 225 and determines what the fragment 225 receives as an input(s) and what the fragment 225 produces as an output(s).

Once the change points 222 of the fragment 225 are inferred by the change point identifier 240, the candidate change points 222 to be externalized are selected. Any of the candidate change points 222 in the fragment 225 can be selected to be externalized. As an example, if the fragment 225 contained one hundred candidate change points 222, and only five were desired to be externalized, then those five candidate change points 222 of the fragment 225 would be selected to be externalized, after the candidate change points 222 were input into the API generator 280, the API generator would output a generated API 226 with the five candidate change points 222 externalized. Clearly, any number of candidate change points 222 can be contained in the fragment 225 and any number of candidate change points 222 can be selected to be externalized in the generated API 226.

The selection of the change points 222 to be included in the generated API 226 may be performed using, for example, a GUI. Once the candidate change points 222 of the fragment 225 are selected, then the API 226 is generated. The API Generator 280 is used to generate the API.

Specifically, the API Generator 280 receives the candidate change points 222 for fragment 225 and then generates an API 226 that includes at least the selected candidate change points 222, tokens required by the syntax of the fragment 225, e.g., key words, parameter names etc., and then encapsulates the fragment 225 of the existing code 220. The fragment 225 is delimited by, for example, any of, a start line and end line in the existing code 220, a column in the existing code 220, a specified selection of the existing code 220 etc.

Figure 13:
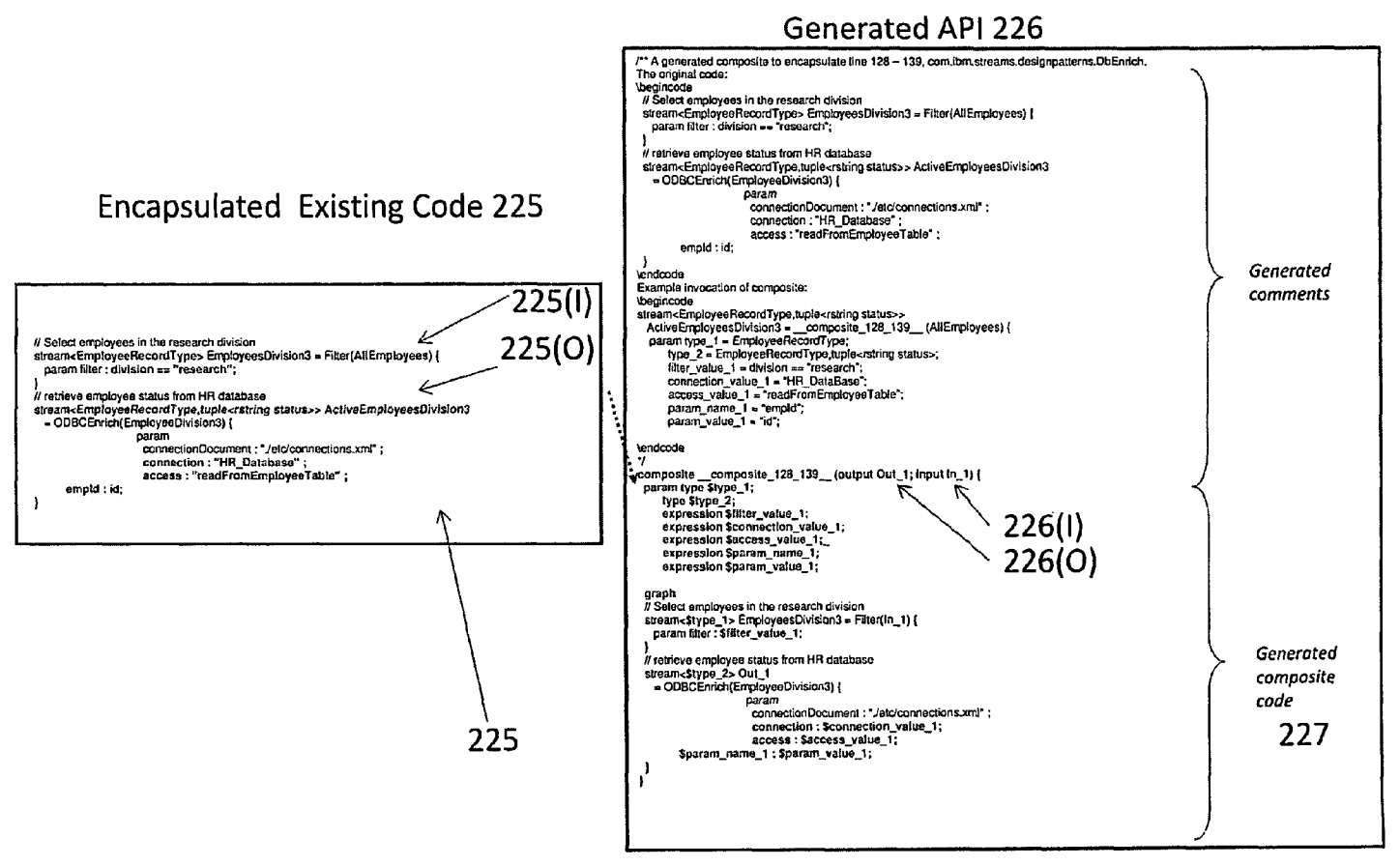

FIG. 13, shows an example of the fragment 225 and the generated API 226. As is shown in FIG. 13, the generated API 226 preferably includes automatically generated comments, as well as, a generated composite code 227. In the example shown in FIG. 13, the selected change points 225(I) and 225(O) of the encapsulated fragment 225 are respectively represented as input(s) 226(I) and the output(s) 226(O) of the generated composite code 227 of the API 226.

In contrast to the exemplary embodiment discussed above, the code that is to be transplanted to the target code 220 is now encapsulated by the API 226. As a result, the number of change points that must be considered in the transplantation can be reduced when compared with the previous exemplary embodiment. Therefore, a developer that is doing the transplantation has a reduced number of tokens that are required to be considered and/or changed in order to successfully transplant the existing code 220 into the target code 210. As a result, the amount of time and intellectual effort consumed by a code reuse task is even further reduced.

Either before or after the API 226 is generated by the API Generator 280, the target code 210 is edited to invoke the generated API 226 by calling generated composite code 227. That is, the existing code 220 is used to generate an API 226 and the target code 210 is used to invoke the generated API 226 using an invocation site, e.g., place where the API 226 is invoked. An example of this feature can be seen in FIG. 14.

Furthermore, to even further reduce the amount it time and intellectual effort required, replacements for the tokens in the API 226 can be suggested by the API Generator 280. To select those change points 222 included in the generated API 226, the API Generator 280 uses those change points 222 that are referenced but are not produced by existing source code 225 (these constitute input) and change points that are produced but not referenced by existing source code 225 (these constitute output). As a result, API 226 may be more easily and quickly integrated invoke by the target source code 210.

These features of the present invention make it possible to provide a method and a system that automatically identifies change points in both target code and existing code and determines which change points need to be updated. Likewise, they make it possible to provide a method and a system that suggests updates to the existing code when it is integrated into the target code. These features of the present invention make it possible for a developer to automatically locate change points. Since the updates to the change points are suggested by the present invention, it is no longer necessary for the developer to have a detailed understanding of how the reused source code (or fraction thereof) was used in the previous application, and how that previous use will cause the reused piece of source code to interact with the target code. Hence, not only is the amount of time required for code reuse reduced by the present invention, but also the intellectual effort of the developer in adapting the existing code to the target application is also reduced.

Figure 15:
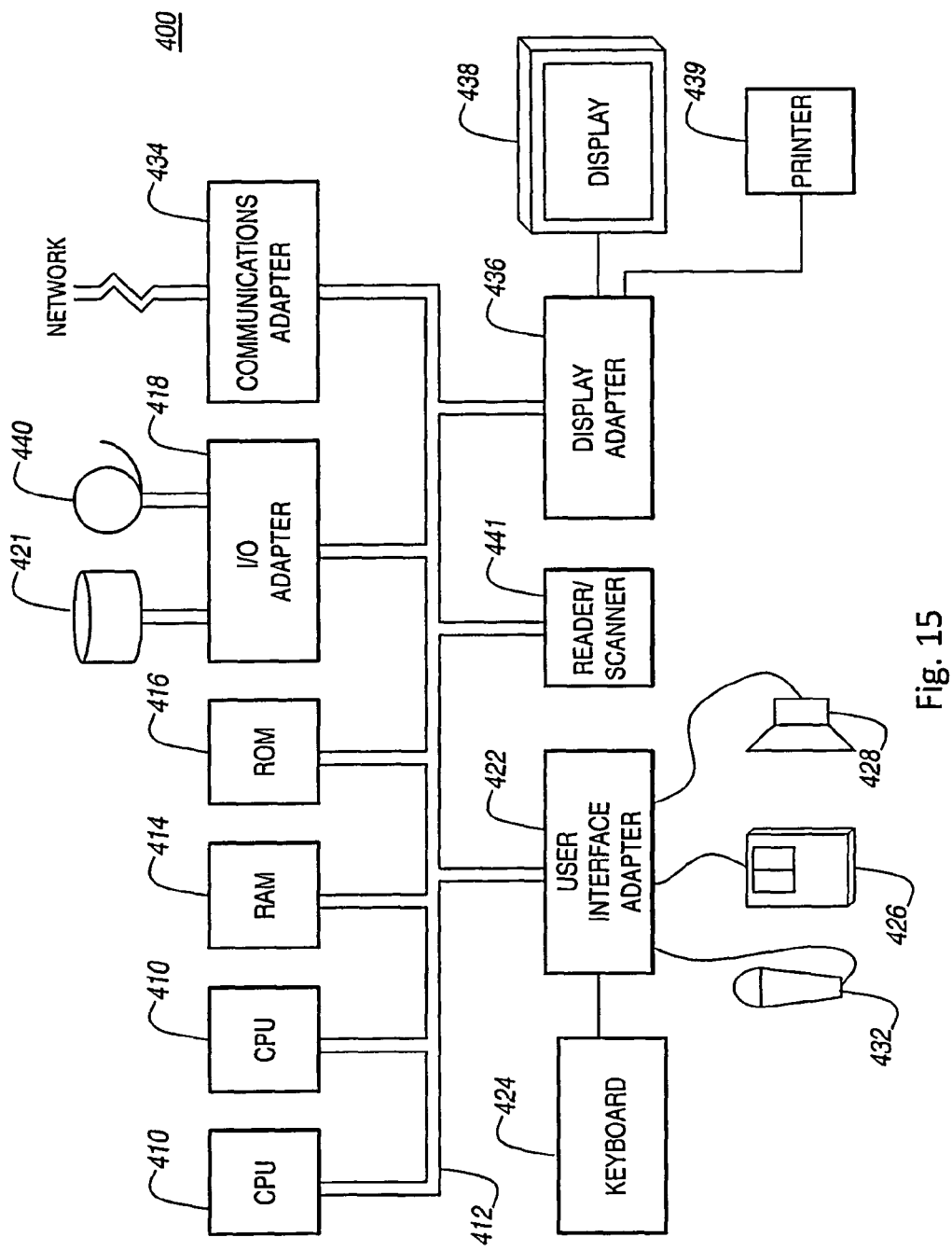
FIG. 15 illustrates a typical configuration which may be used to implement the exemplary embodiments of the present invention.

FIG. 15 illustrates a typical hardware configuration 400 which may be used for implementing the inventive concepts discussed above. The configuration has preferably at least one processor or central processing unit (CPU) 410. The CPUs 410 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting an information handling system to a data processing network, the Internet, an Intranet, a personal area network (PAN), etc., and a display adapter 436 for connecting the bus 412 to a display device 438 and/or printer 439. Further, an automated reader/scanner 441 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of storage media.

Thus, this aspect of the present invention is directed to a programmed product, including storage media tangibly embodying a program of machine-readable instructions executable by a digital data processor to perform the above method. The storage media may be a non-transitory storage media.

Such a method may be implemented, for example, by operating the CPU 410 to execute a sequence of machine-readable instructions. These instructions may reside in various types of storage media.

Thus, this aspect of the present invention is directed to a programmed product, including storage media tangibly embodying a program of machine-readable instructions executable by a digital data processor incorporating the CPU 410 and hardware above, to perform the method of the invention.

This storage media may include, for example, a RAM contained within the CPU 410, as represented by the fast-access storage for example. Alternatively, the instructions may be contained in another storage media, such as a magnetic data storage diskette 500 or compact disc 502 (FIG. 16), directly or indirectly accessible by the CPU 410.

Whether contained in the computer server/CPU 410, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable storage media. In an illustrative embodiment of the invention, the machine-readable instructions may comprise software object code, compiled from a language such as C, C++, etc.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A processor-executed method of integrating an existing source code into a target source code, the method comprising:
   mapping a plurality of candidate mappings between a change point of the existing source code and a plurality of change points of the target source code;
   selecting a candidate mapping of the plurality of candidate mappings;
   forming a plurality of change point pairs by pairing the change point of the existing source code with each change point of the plurality of change points of the target source code;
   selecting the plurality of suggested candidate mappings from the plurality of change point pairs;
   filtering a number of available change point pairs to be selected from, based on a previously selected candidate mapping;
   automatically updating the existing source code based on the candidate mapping having been selected, using a processor on a computer; and
   transplanting the existing source code having been updated into the target source code.

2. The method according to claim 1, wherein the change point of the existing source code comprises a token, and
   wherein the method further comprises automatically identifying whether the token needs to be changed based on one or more tokens of the plurality of change points of the target source code.

3. The method according to claim 1, further comprising updating one or more tokens of the change point of the existing source code.

4. The method according to claim 1, further comprising updating one or more tokens of each change point of the plurality of change points of the target source code.

5. The method according to claim 1, further comprising automatically identifying
the change point of the existing source code and the plurality of change points of the target source code.

6. The method according to claim 1, further comprising:
parsing the target source code and the existing source code;
producing a model specification of the target source code based on the parsed target source code; and
producing a model specification of the existing source code based on the parsed existing source code.

7. The method according to claim 6, further comprising:
automatically identifying the change point of the existing source code based on the model of the existing source code; and
automatically identifying the plurality of change points of the target source code based on the model of the target source code.

8. The method according to claim 1, further comprising filtering the plurality of suggested candidate mappings based on a similarity between the change point of the existing source code and each change point of the plurality of change points of the target source code.

9. The method according to claim 1, further comprising:
forming a plurality of change point pairs by pairing the change point of the existing source code with each change point of the plurality of change points of the target source code; computing a measure of similarity for each change point pair of the plurality of change point pairs; and
selecting a plurality of suggested candidate mappings from the plurality of change point pairs having a measure of similarity greater than a predetermined threshold.

10. The method according to claim 1, wherein the existing source code comprises a plurality of change points including the change point, and
wherein the method further comprises identifying whether a candidate mapping exists
between each change point of the existing source code and each change point of the plurality of change points of the target source code.

11. The method according to claim 10, wherein, when the plurality of change points of the existing source code comprises a plurality of change points that share a suggested candidate mapping to one or more change points of the plurality of change points of the target source code, filtering the plurality of suggested candidate mappings based on whether a change point of the plurality of change points that share candidate mappings to one or more change points of the plurality of change points of the target source code comprises a boundary change point.

12. The method according to claim 11, wherein the change point of the existing source code is determined to comprise a boundary change point when the change point of the plurality of change point of the existing source code is referenced by and not produced by the existing source code.

13. The method according to claim 11, wherein the change point of the existing source code is determined to comprise a boundary change point when the change point of the plurality of change point of the existing source code is produced by and not referenced by the existing source code.

14. A method for integrating a fragment of an existing source code into a target source code, the method comprising:
mapping a plurality of candidate mappings between a change point of the fragment of existing source code and a plurality of change points of the target source code;
selecting a candidate mapping of the plurality of candidate mappings;
forming a plurality of change point pairs by pairing the change point of the existing source code with each change point of the plurality of change points of the target source code;
selecting the plurality of suggested candidate mappings from the plurality of change point pairs;
filtering a number of available change point pairs to be selected from, based on a previously selected candidate mapping;
automatically updating the fragment of the existing source code based on the candidate mapping having been selected, using a processor on a computer; and
transplanting the fragment of the existing source code having been updated into the target source code.

15. The method according to claim 14, further comprising inserting the updated fragment of the existing source code into a specified location of the target source code.

16. The method according to claim 14, further comprising:
encapsulating the fragment;
generating an Application Program Interface (API) comprising an input and an output based on a plurality of change points of the encapsulated fragment;
suggesting a plurality of candidate mappings between the change point of the plurality change points of the existing source code and the plurality of change points of the target source code;
automatically updating the target source code to invoke the API, based on a selected candidate mapping of the plurality of suggested candidate mappings; and
inserting the updated target source code into the target source code.

17. The method according to claim 16, further comprising filtering the plurality of suggested candidate mappings so that the input of the API is selected from change points that are referenced but are not produced by existing source code and so that the output of the API is selected from change points that are produced but not referenced by existing source code.

18. A non-transitory tangible computer-readable storage medium embodying a program of machine-readable instructions executable by a digital processing apparatus to perform an instruction control method, wherein the program integrates an existing source code or a fragment thereof into a target source code, the instruction control method comprising:
mapping a plurality of candidate mappings between a change point of existing source code or a fragment thereof and a plurality of change points of the target source code;
selecting a candidate mapping of the plurality of candidate mappings;
forming a plurality of change point pairs by pairing the change point of the existing source code with each change point of the plurality of change points of the target source code;
selecting the plurality of suggested candidate mappings from the plurality of change point pairs;
filtering a number of available change point pairs to be selected from, based on a previously selected candidate mapping;

automatically updating the existing source code or the fragment thereof based on the candidate mapping having been selected; and transplanting the existing source code or the fragment thereof having been updated into the target source code.

\* \* \* \* \*